V. B. KORNER.
POWER TAKE-OFF MECHANISM.
APPLICATION FILED SEPT. 7, 1920.

1,401,157.

Patented Dec. 27, 1921.
3 SHEETS—SHEET 1.

Inventor:
Vane B. Korner

V. B. KORNER.
POWER TAKE-OFF MECHANISM.
APPLICATION FILED SEPT. 7, 1920.
1,401,157.
Patented Dec. 27, 1921.
3 SHEETS—SHEET 2.
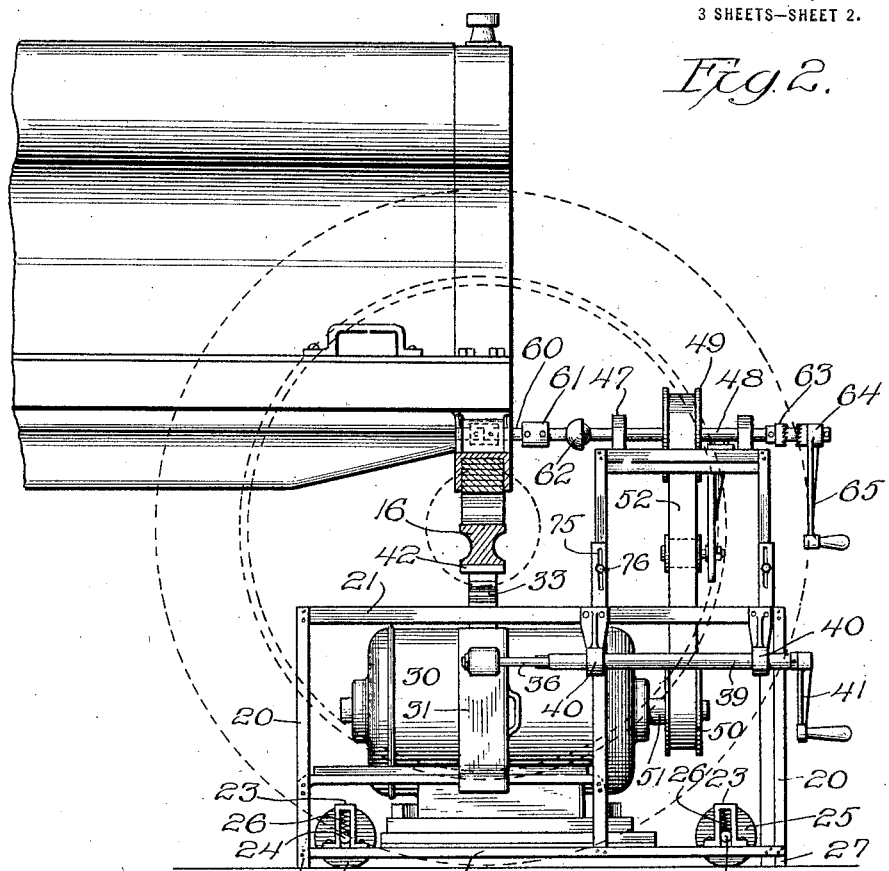
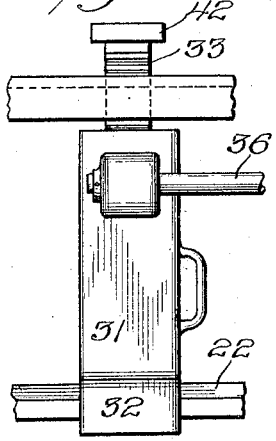
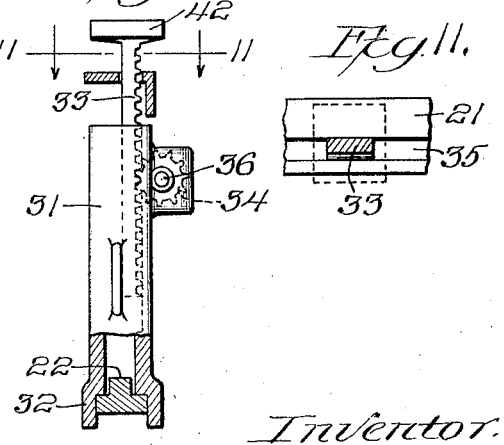
Inventor.
Vane B. Korner V. B. KORNER.
POWER TAKE-OFF MECHANISM.
APPLICATION FILED SEPT. 7, 1920.
1,401,157.
Patented Dec. 27, 1921.
3 SHEETS—SHEET 3.
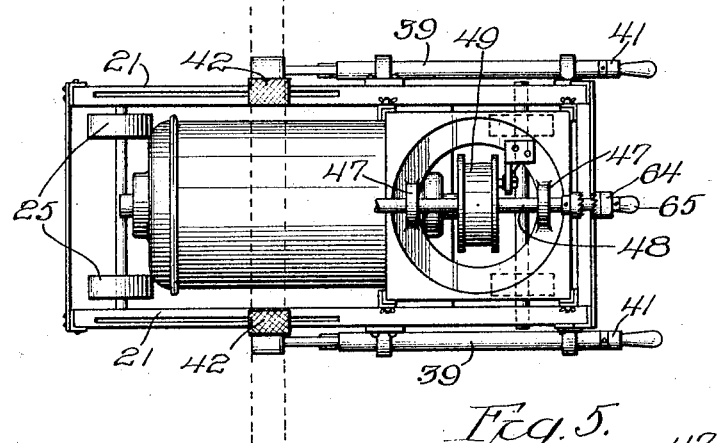
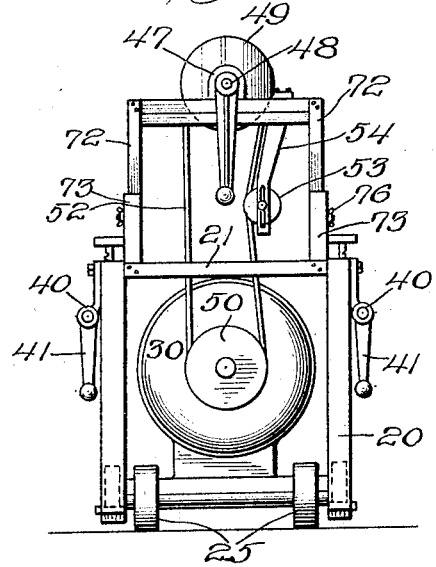
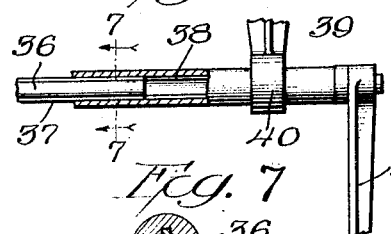
Inventor:
Vane B. Korner

UNITED STATES PATENT OFFICE.

VANE B. KORNER, OF LA GRANGE, ILLINOIS.

POWER TAKE-OFF MECHANISM.

1,401,157.  Specification of Letters Patent.  Patented Dec. 27, 1921.

Application filed September 7, 1920. Serial No. 408,592.

*To all whom it may concern:*

Be it known that I, VANE B. KORNER, a citizen of the United States, residing at La Grange, in the county of Cook and State of Illinois, have invented certain new and useful Improvements in Power Take-Off Mechanism, of which the following is a specification.

This invention relates to a mechanism to which power may be transmitted from the engine shaft of a self-propelled vehicle. In the exemplification shown, I have disclosed a unitary structure wherein the power is utilized to drive a generator for supplying an electric current which may be used for any desired purpose, but other desired applications of the power may, of course, be made.

Referring to the drawings which illustrate a preferred embodiment of this invention—

Fig. 2 is a side elevation of the mechanism in operative relation to the adjacent parts of an automobile;

Fig. 3 is a plan view of the mechanism;

Fig. 4 is a front end view thereof;

Fig. 5 is a detail in side elevation of the turn table employed;

Fig. 6 is a detail, partly in section and partly in elevation, of the shaft operating the jack;

Fig. 7 is a transverse section therethrough taken on line 7—7 of Fig. 6;

Figs. 9 and 10 are front and side views in elevation of the jack; and

Fig. 11 is a transverse section therethrough taken on line 11—11 of Fig. 10.

Figure 1:
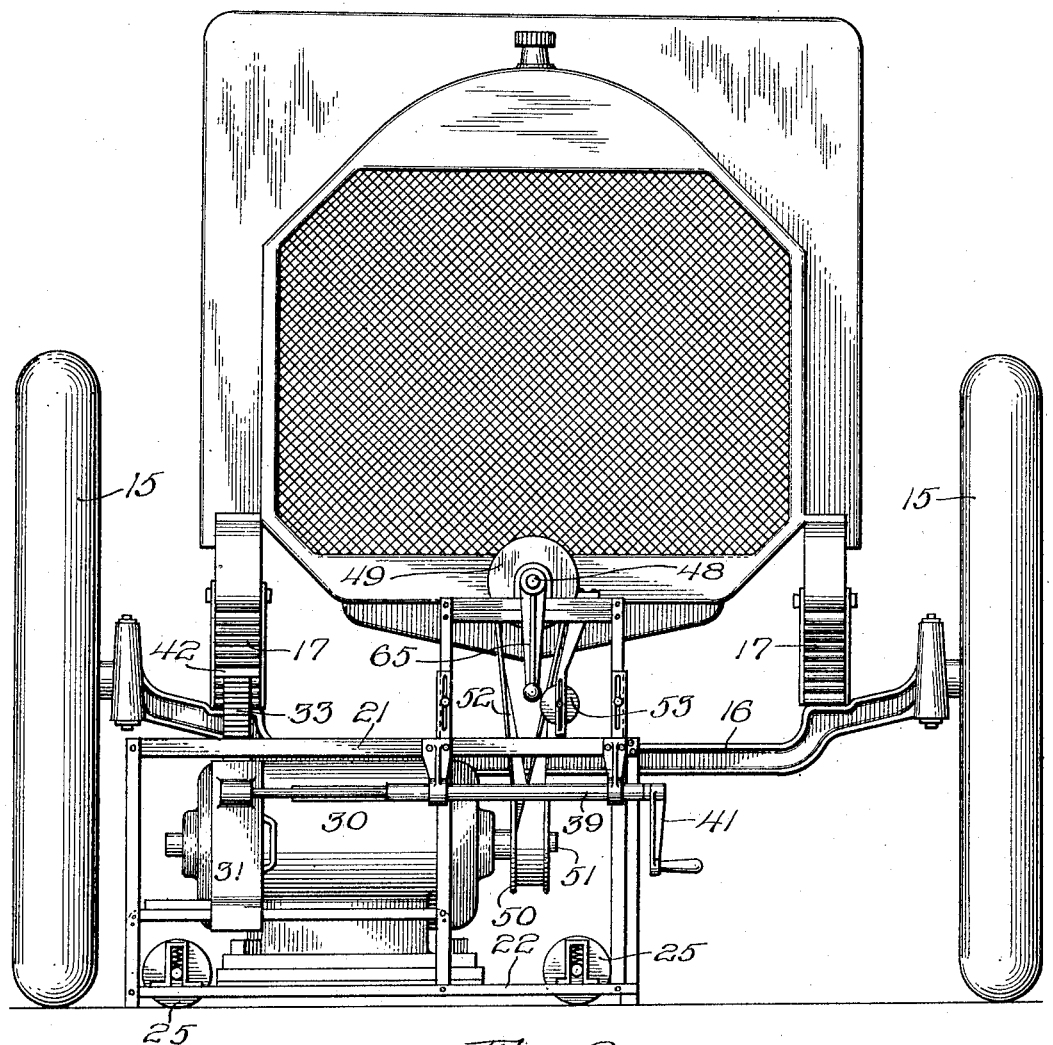
Figure 1 is a front view of an automobile with the power take-off mechanism of this invention operatively attached hereto.
Figure 8:
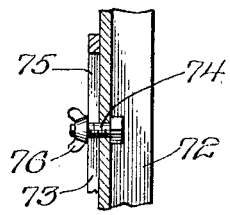
Fig. 8 is a detail of one form of lock which may be used to hold the device at the required elevation for attachment to the engine shaft.

As shown in the drawings, the device of the invention is designed for association with the front end of an automobile having the usual wheels 15 mounted upon the ends of an axle 16 on which are supported the usual springs 17 which carry the frame for the power plant. The front end of the engine shaft may be rotated through the medium of a hand crank if such a practice be necessary, and it is with the end of the shaft so formed to receive a starting crank that attachment is made to drive the power take-off mechanism of this invention.

Referring now particularly to Fig. 2, I have shown a framework comprising certain upright members 20 connected at their upper and lower ends by means of rails 21 and 22 respectively, there being a pair of guideways 23 associated with each lower rail within which is slidably mounted the axle 24 of a roller 25. By means of a spring 26 the axle is normally held at the lower end of the guideway such as to project the frame upwardly from the ground, but when a load is imposed upon the frame, the springs 26 are compressed so as to permit legs 27 that are arranged at the bottom end of the uprights to rest directly upon the ground to thereby afford support for the frame.

Upon the framework is a mounting for a generator 30 adapted to be driven by means presently to be described. A pair of jacks are also carried by the frame each of which, in the form shown in Figs. 9 and 10, comprises a housing 31 whose lower end 32 is forked to straddle the rail 22, there being within the housing a rack bar 33 adapted to be moved through the medium of a pinion 34 which may also be incased within the same housing, as shown. The rack bar is adapted to lie within a slot 35 formed within the rail 21 so that the entire jack may be shifted longitudinally of the framework to any position desired. A shaft 36 is connected at one end with the pinion and is provided with one or more keys 37 adapted to slidingly fit within grooves 38 formed interiorly of a tubular shaft 39 which is supported within bearings 40, a crank handle 41 being connected to the shaft 39 for the purpose of operating same. By some such means as this the pinion 34 is rotated to raise and lower the rack bar 33 whose upper end is preferably formed with a head 42 adapted to abut the under side of the front axle 16, as shown in Fig. 2, or the under side of the spring 17, as shown in Fig. 1. According to the construction described, the frame may be wheeled in place beneath the forward end of the automobile, following which the handles 41 are turned to operate the jacks which engage with the axle or spring to thereby lower the frame to the ground against the tension of the springs 26. Suitable dog and ratchet mechanism (not shown) may, of course, be provided for normally holding the shafts 36 against reverse movement.

At the forward end of the frame upon its upper side is mounted a turn table, best shown in Fig. 5. This may comprise a circular ring plate 43 that is flanged as at 44 to coöperate with a flanged ring 45 and be held in place thereby. A lock of any approved kind, such as the thumb-screw 46, may be arranged for holding the turn table in any desired rotative position. Projecting upwardly from the turn table are a pair of brackets 47 each formed to provide a bearing in which is mounted a shaft 48 that carries a fast pulley 49. A second pulley 50 that is secured fast to the generator shaft 51 may be driven from pulley 49 as by means of a belt 52, a tightening device (best shown in Fig. 4) being interposed between the two pulleys, which may consist of a roller 53 that is slidably held within a bracket 54 carried by the turn table so as to be moved toward or from the center line between the two pulleys as required to take up the slack.

Whenever desired, or when conditions may require, the frame may be positioned beneath the automobile in a manner other than that shown in Fig. 2. For instance, the frame may be disposed with its long dimension in alinement with the axle 16, as shown in Fig. 1. In such a case the turn table is rotated properly to present the shaft 48 in alinement with the engine shaft. The belt 52 in such circumstances would be twisted, as shown in Fig. 1, without, however, impairment of its operative connection between the two pulleys.

The shaft 48 which derives power from the engine shaft is connected thereto in any suitable manner. A suggestive arrangement is shown in Fig. 2, wherein the engine shaft is equipped with a forwardly extending stub shaft 60 on which is a clutch collar 61 which is detachably connected to one end of the shaft 48 through the medium of a universal joint 62. The opposite end of the shaft 48 may be provided with a toothed collar 63 adapted to coöperate with the toothed collar 64 of a crank 65. In this manner the crank, when attached to the shaft 48, is operative to start the engine, if this be necessary. Obviously the same or a similar crank might connect with the stub shaft 60 for the same purpose whenever the framework is removed. Moreover, a single crank 41 or 65 might be utilized for the operation of the two jack shafts and for turning the engine as well, but these are features wholly incidental to my invention.

The turn table, as will be noted best in Fig. 2, is mounted upon a circular base plate 70 which is supported at the upper ends of a plurality of uprights 72, four being the number shown. Each of these uprights is slidingly arranged within an angle bar 73 which serves as a guide therefor, there being a bolt 74 entered through each upright and through a slot 75 in each guide, so as to permit the use of a thumb nut 76 for the purpose of tightening the uprights in place in any desired adjustment. By these means the shaft 48 may be raised or lowered to the desired elevation necessary for operative connection with the engine shaft.

It will be observed that the device of this invention may be readily attached in place or be removed therefrom with very slight effort. It provides within itself means for remaining securely in place by the use of jacks which may engage with the under side of the front axle or front spring. The angular relation which the frame bears to the vehicle axle is of no consequence since I have provided a turn table which may be rotated to present the driven shaft 48 in alinement with the engine shaft from which it derives power. The driving connection between the shaft 48 and the generator shaft, if such an implement be carried on the frame, is one which remains unaffected by rotary movements of the turn table, or by vertical movements of the frame on which it is carried. In addition means are provided for raising and lowering the driven shaft 48 so that alinement with the engine shaft may always be assured. It will further be understood that whenever desired the belt 52 connecting the pulley 49 with the generator pulley 50 may be dispensed with, so that power may be taken directly from the pulley 49 to any desired point. This pulley might then be positioned upon the forward extremity of the shaft 48, or be supplemented by a second pulley at this point, such alternate arrangements being entirely optional.

I claim:

1. In a device of the kind described, the combination of a framework, a generator mounted on the framework, a pulley on the generator shaft, a second frame mounted on the framework and adapted to be raised and lowered relative thereto, a shaft journaled in said movable frame and having means for connecting with the engine shaft of a power driven vehicle, a pulley on the last named shaft, a belt connection between the two pulleys whereby power is transmitted from the shaft connected with the engine to the generator shaft, and means permitting the shaft journaled in the movable frame to swing about a vertical axis without affecting the driving connection between the two pulleys, substantially as described.

2. In a device of the kind described, the combination of a framework, a jack carried thereby and adapted to engage with an under part of a vehicle, a movable frame carried on the framework and adapted to be raised or lowered relative thereto, a shaft rotatably mounted in the movable frame, means for connecting one end of the shaft with the engine shaft of the vehicle, and means associated with the opposite end of the shaft for transmitting movement to the engine shaft, substantially as described.

3. In a device of the kind described, the combination of a framework, a jack carried by the framework adapted to engage an under part of a vehicle, guides extending upwardly from the framework, a frame vertically movable within the guides, means for securing the movable frame in a selected vertical position of adjustment, a turn table mounted on the frame, and a shaft rotatably carried upon the turn table adapted for connection with the engine shaft of the vehicle, substantially as described.

4. In a device of the kind described, the combination with a framework of a jack mounted thereon and adapted to engage an under part of a vehicle, means carried by the frame for operating the jack, a shaft carried by the frame adapted for connection with the engine shaft of a power driven vehicle, and means for vertically adjusting the first named shaft to aline the same with the engine shaft, substantially as described.

5. In a device of the kind described, the combination with a framework of a turn table carried thereby consisting of a circular ring, a base plate in which the ring is seated, means adjustably supporting the base plate upon the frame and adapting it to be raised or lowered relative thereto, a shaft mounted upon the turn table and adapted for connection with the engine shaft of a power driven vehicle, a pulley carried by the first named shaft and disposed in the middle region of the turn table, a driven shaft mounted on the framework having a pulley thereon which lies below the pulley on the shaft which is connected with the engine shaft, a belt connection between the two pulleys passing through the turn table, and means for holding the belt taut during different positions of adjustment of the turn table both rotary and vertical relative to the framework, substantially as described.

6. In a device of the kind described, the combination of a main framework, a jack carried thereby and adapted to engage with an under part of a vehicle, a second frame movably mounted on the main framework, means for securing the second frame in a selected position of adjustment, a turn table mounted on the second frame, and a shaft rotatably carried upon the turn table adapted for connection with the engine shaft of the vehicle, substantially as described.

7. In a device of the kind described, the combination with a main framework of a jack shiftably mounted thereon and adapted to engage with an under part of a vehicle, a second frame movably mounted on the main framework, a shaft carried on the second shaft adapted for connection with the engine shaft of the vehicle, a second shaft carried on the main framework, and a driving connection between the two shafts operative in any adjusted position of the second frame relative to the main framework, substantially as described.

8. In a device of the kind described, the combination with a framework on which is carried a shaft adapted for connection with a part driven by the engine of a self-propelled vehicle, of a jack mounted to shift laterally upon the framework and adapted to exert a lifting pressure upon an under part of the vehicle, and operating means for the jack mounted stationary upon the frame work and operable in any of the laterally adjusted positions of the jack, substantially as described.

VANE B. KORNER.

Witness:
EPHRAIM BANNING.